United States Patent [19]

Pederson et al.

[11] Patent Number: 4,669,417
[45] Date of Patent: Jun. 2, 1987

[54] TIRE SPRAYING APPARATUS

[75] Inventors: Loren K. Pederson, Moorhead; Richard A. Curtis, Lake Park, both of Minn.

[73] Assignee: Branick Industries, Inc., Fargo, N. Dak.

[21] Appl. No.: 865,031

[22] PCT Filed: Apr. 18, 1985

[86] PCT No.: PCT/US85/00725
§ 371 Date: May 13, 1986
§ 102(e) Date: May 13, 1986

[87] PCT Pub. No.: WO86/06008
PCT Pub. Date: Oct. 23, 1986

[51] Int. Cl.⁴ .............................................. B05B 13/06
[52] U.S. Cl. ...................................... 118/44; 118/305; 118/316; 118/318; 118/320
[58] Field of Search ................. 118/44, 305, 316, 318, 118/320

[56] References Cited

U.S. PATENT DOCUMENTS

| Re. 14,765 | 12/1919 | Urbach . | |
|---|---|---|---|
| 1,471,787 | 10/1923 | Gammeter . | |
| 1,474,654 | 11/1923 | Urbach . | |
| 1,850,238 | 3/1932 | Maynard . | |
| 1,876,967 | 9/1932 | Krause et al. . | |
| 1,983,684 | 12/1934 | Strong | 91/14 |
| 2,758,037 | 8/1956 | Cahill | 117/62 |
| 2,782,757 | 2/1957 | Carnes | 118/301 |
| 2,799,243 | 7/1957 | Harb | 118/320 |
| 2,805,699 | 9/1957 | Reading | 154/9 |
| 2,908,247 | 10/1959 | Glaze et al. | 118/320 |
| 3,825,965 | 7/1974 | Root et al. | 118/73 |
| 3,962,987 | 6/1976 | Brandl | 118/44 |
| 4,115,172 | 9/1978 | Baboff et al. | 156/115 |
| 4,125,639 | 11/1978 | Brandl | 427/233 |
| 4,206,008 | 6/1980 | Tacke et al. | 156/115 |
| 4,262,624 | 4/1981 | Soeda et al. | 118/44 |
| 4,272,301 | 6/1981 | Galbraith et al. | 134/8 |
| 4,281,621 | 8/1981 | Tacke et al. | 118/500 |
| 4,289,089 | 9/1981 | Tacke et al. | 118/306 |
| 4,306,826 | 12/1981 | Detwiler | 414/27 |
| 4,356,214 | 10/1982 | Soeda et al. | 427/233 |
| 4,398,492 | 8/1983 | Casey | 118/105 |
| 4,407,220 | 10/1983 | Fesmire | 118/64 |
| 4,430,958 | 2/1984 | Boggs | 118/668 |

Primary Examiner—Shrive P. Beck
Attorney, Agent, or Firm—Merchant, Gould, Smith, Edell, Welter & Schmidt

[57] ABSTRACT

A tire spraying apparatus is disclosed including a frame having a vertically extending standard and a generally horizontal extending tire supporting frame portion receivable in the opening of a tire. The tire supporting frame portion includes a pair of spaced, tire bead engaging drive rollers and mounted below the frame portion is a tire hold-down member to engage the tire beads to hold the tire against the rollers. Liner spray nozzle means are mounted between the rollers for spraying a liquid liner material upwardly into the tire interior and bead spreading means extend upwardly from the tire supporting frame portion for spreading the sidewalls of a tire mounted thereon to hold the sidewalls apart while the tire is being rotated and sprayed. Mounted generally above the tire is a trailer member having a tire crown engaging wheel and carrying a plurality of recapping cement spray nozzles. Both the trailer member and the hold-down member can be raised out of engagement with the tire to permit the tire to be removed and replaced.

20 Claims, 10 Drawing Figures

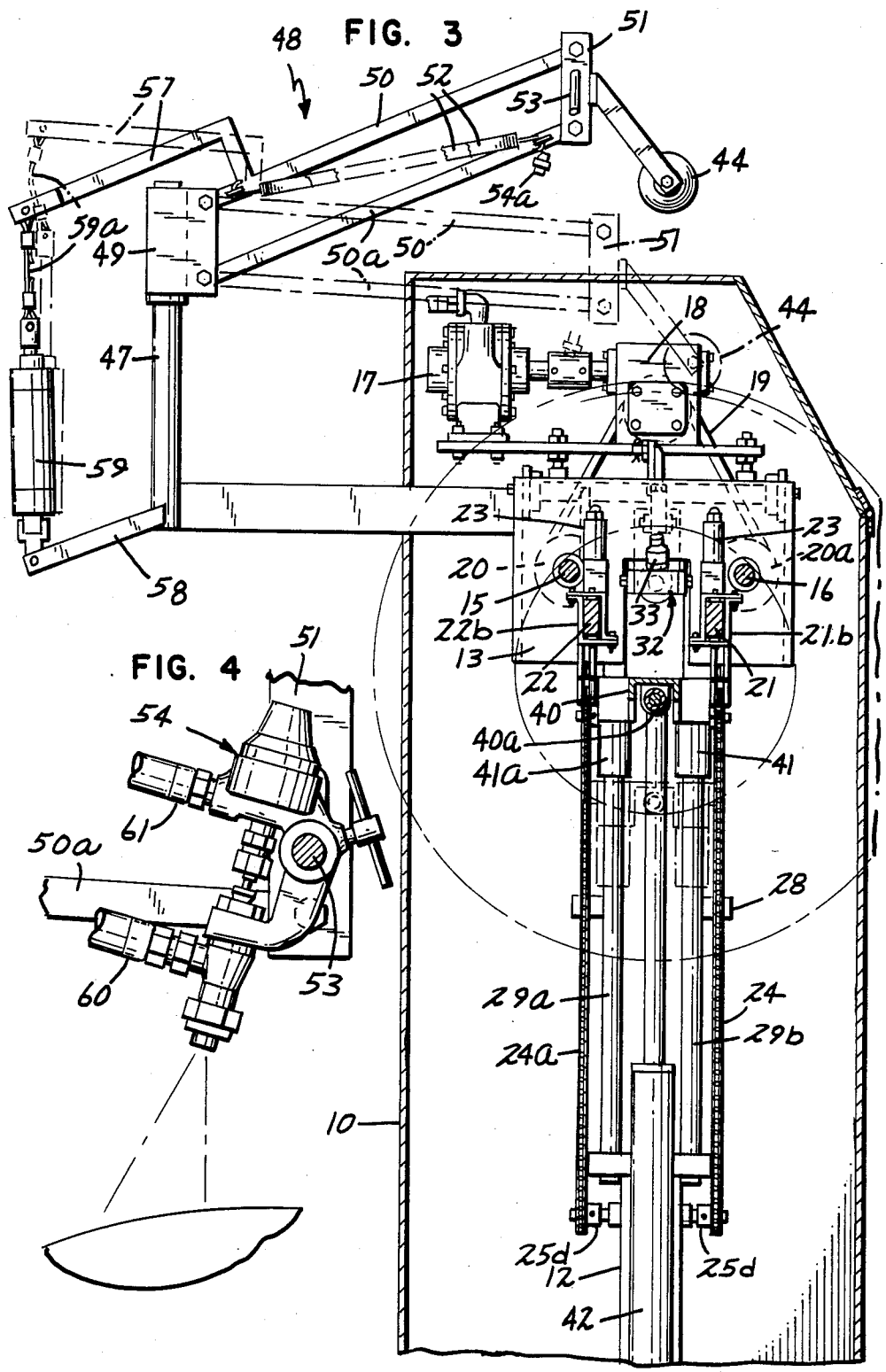

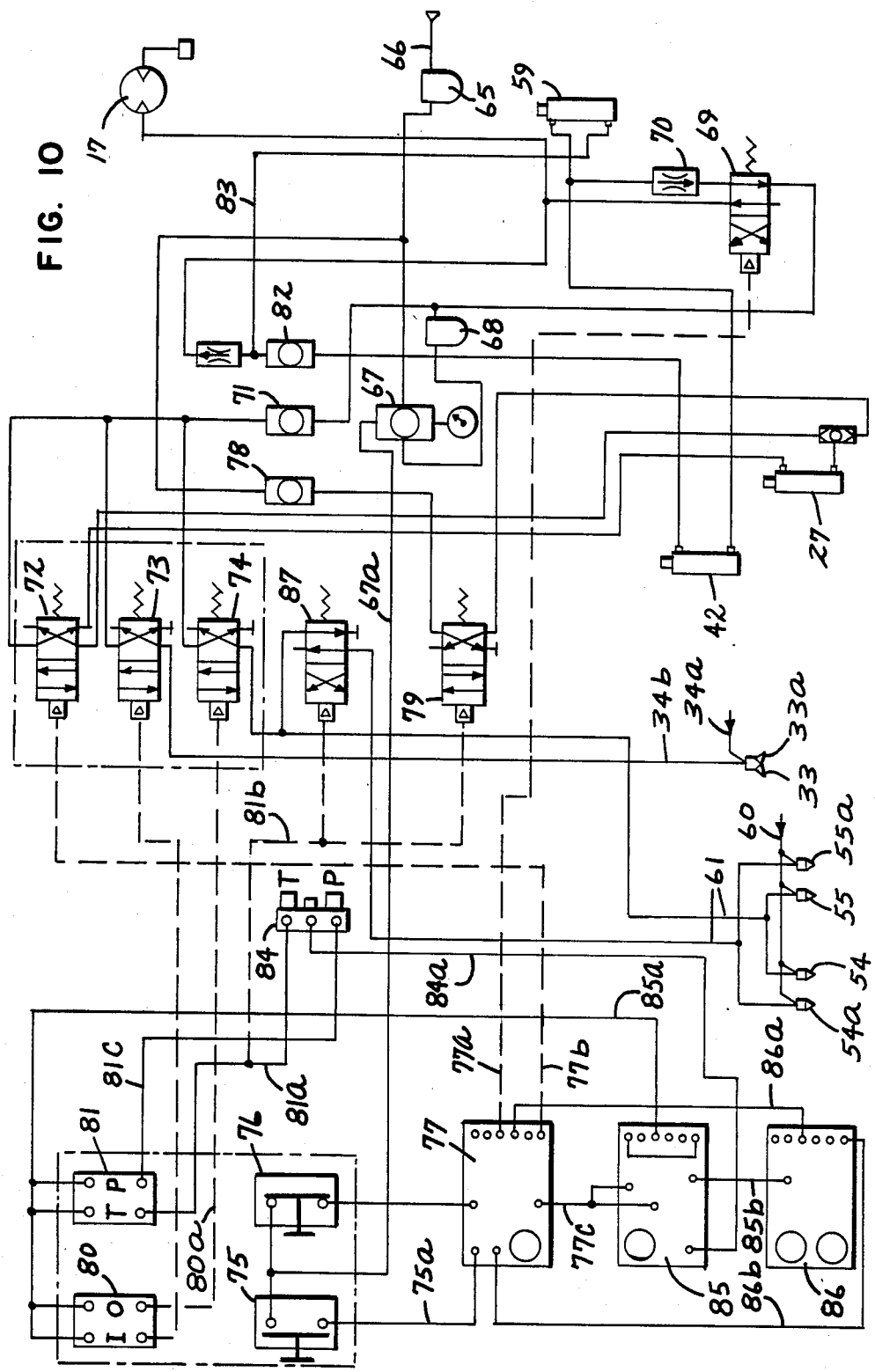

TIRE SPRAYING APPARATUS

BACKGROUND OF THE INVENTION

Tires for passenger cars, trucks and the like are often recapped when the tread has worn off. If the tire carcass is basically sound, the worn tread portion is removed to provide a smooth crown portion of the tire to which a new tread may be applied. If a new, previously formed tread is to be attached to the tire crown, a recapping cement is applied to the crown to hold the gum rubber to the tire. If a new tread is to be applied by an extruding process, cement may be applied to the tire crown to hold the strip wound extrusion in place. Before the new tread is applied, it is also common practice to apply a liner spray to the interior of the tire to seal small holes, cracks, etc. in the tire which might permit air to leak through to the crown and cause partial separation of the new tread from the tire. The liner material is a liquid which is commercially available in spray form and is usually a synthetic rubber composition dissolved in a solvent so that it can be sprayed into the tire interior where it coagulates to provide the necessary seal.

Although these materials are usually applied manually, as by spraying or the like, attempts have been made to automate horizontally extending support means including a pair of spaced rollers which engaged the tire beads for rotating the tire. Also extending from the frame through the tire opening was a hold-down arm which engaged the lower portion of the tire beads to hold the tire against the rollers. A pair of tire spreading rollers were mounted on the hold-down arm. One was fixed on the arm and the other was mounted on a moveable, adjustable slider which permitted the distance between the rollers to be adjusted to accommodate different tire sizes. Two liner spray heads were also provided, one being mounted adjacent the fixed roller and the other being mounted on the adjustable slider, both being positioned to spray down into the tire interior. Although this machine was an improvement over prior manual operations, it did not apply the liner spray equally well to different size tires and it did not provide a means of automatically applying recapping cement.

SUMMARY OF THE INVENTION

Spraying apparatus is provided for tires having spaced beads surrounding a central opening, having a crown portion and having spaced side walls connecting the beads to the crown portion. A support frame has a tire supporting frame portion extending horizontally therefrom which includes a pair of spaced, tire bead engaging drive rollers for rotating a tire suspended thereon. A tire hold-down member, which is mounted on the support frame for vertical movements between a raised position and a lower, tire bead engaging position, extends from the support frame below the tire supporting frame portion to engage the tire beads to hold the tire against the drive rollers. Liner spray nozzle means are mounted between the drive rollers for spraying a liquid liner material upwardly into the tire interior. Tire bead spreading means extend upwardly from the tire supporting frame portion for spreading the side walls of a tire mounted thereon to hold the side walls apart while the tire is being rotated and sprayed.

In the preferred embodiment of the invention, the tire spraying apparatus also includes further spray nozzle means, and means mounting the further spray nozzle means generally above the tire for spraying a recapping cement on the tire crown as the tire is being rotated.

BRIEF DESCRIPTION OF THE DRAWINGS

FIG. 3 is a sectional view as seen generally from the line 3—3 of FIG. 2, portions thereof being broken away;

FIG. 4 is a sectional view taken along line 4—4 of FIG. 2 on an enlarged scale;

FIG. 10 is a fluid power diagram of the control circuit for the tire spraying machine.

DESCRIPTION OF THE PREFERRED EMBODIMENT

Figure 1:
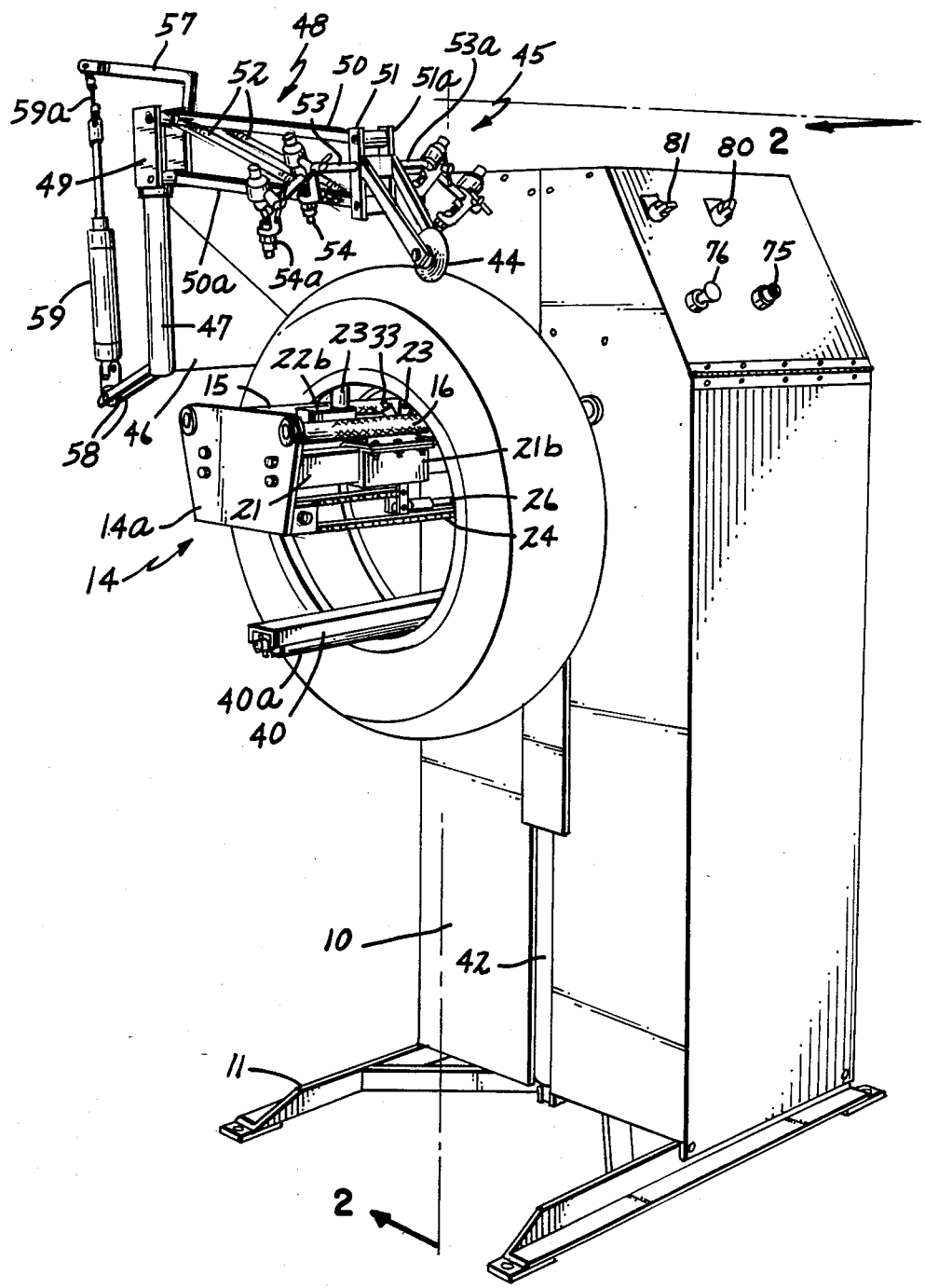
FIG. 1 is a view in perspective of a tire spraying machine according to our invention.

Referring now to the drawings, there is disclosed a tire spraying machine having an outer housing or casing 10 carried by a support frame which includes a base 11, a vertical standard 12 and a mounting head 13 spaced above the base 11. Extending horizontally in cantilever fashion from the mounting head 13 is a tire supporting frame portion 14 which terminates in an end plate 14a. Portion 14 includes a pair of spaced, tire bead engaging drive rollers 15, 16 which are journalled at one end in the mounting head 13 and at the other end in the end plate 14a. Drive rollers 15, 16 extend parallel to each other in a horizontal plane and each has a knurled outer surface designed to engage the beads of a tire suspended thereover for rotating the tire. Drive rollers 15, 16 are rotated by means of an air motor 17 acting through a gear reduction unit 18 having a drive pulley 18a actuating a drive belt 19 which engages driven pulleys 20, 20a mounted on the ends of the drive rollers 15, 16. In the embodiment shown, drive pulley 18 rotates at approximately 280 rpm and the drive rollers or rods are rotated at approximately 300 rpm, in the same direction, although different speeds could be used if desirable for a specific application.

Figure 2:
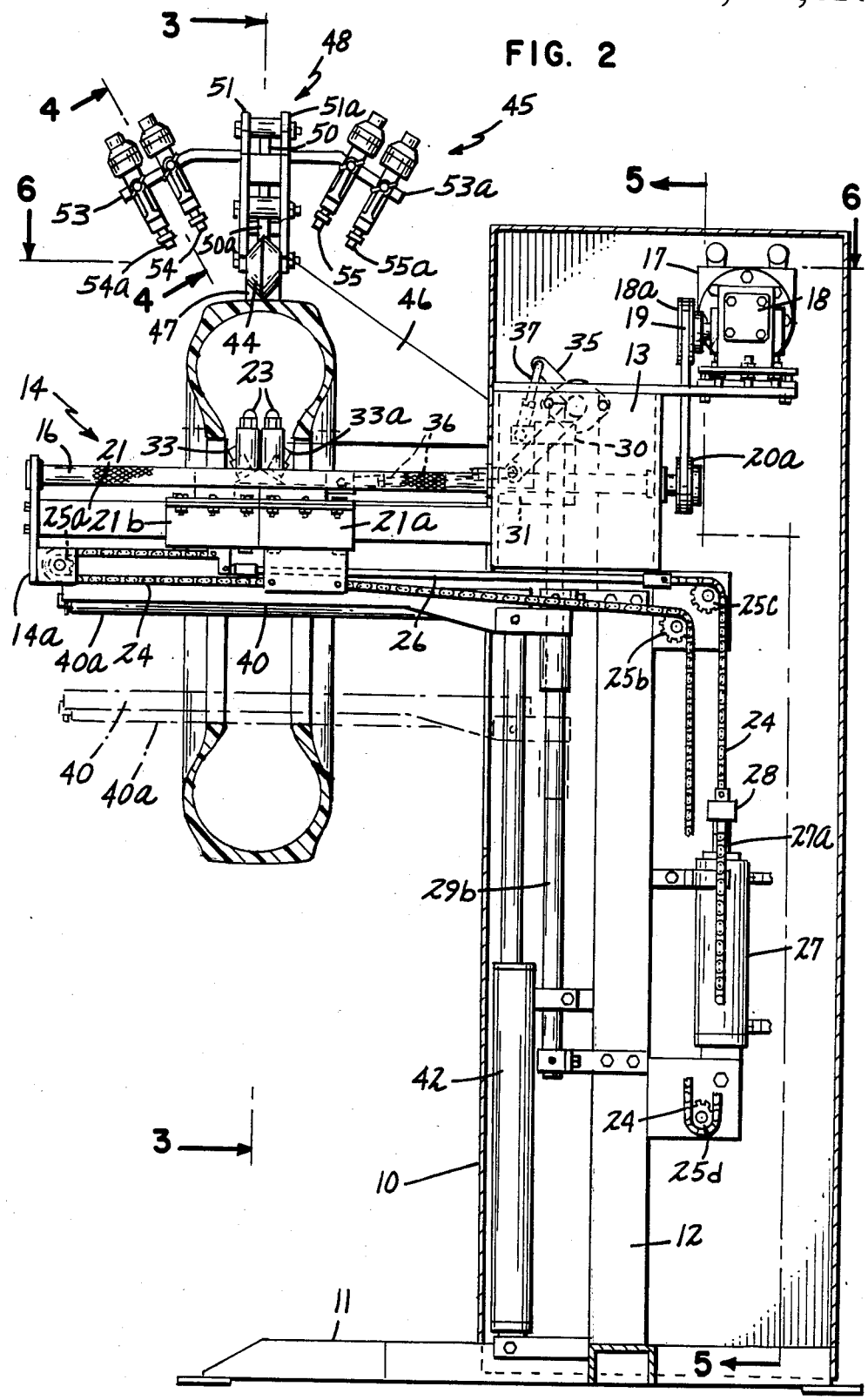
FIG. 2 is a sectional view as seen generally from the line 2—2 of FIG. 1.
Figure 5:
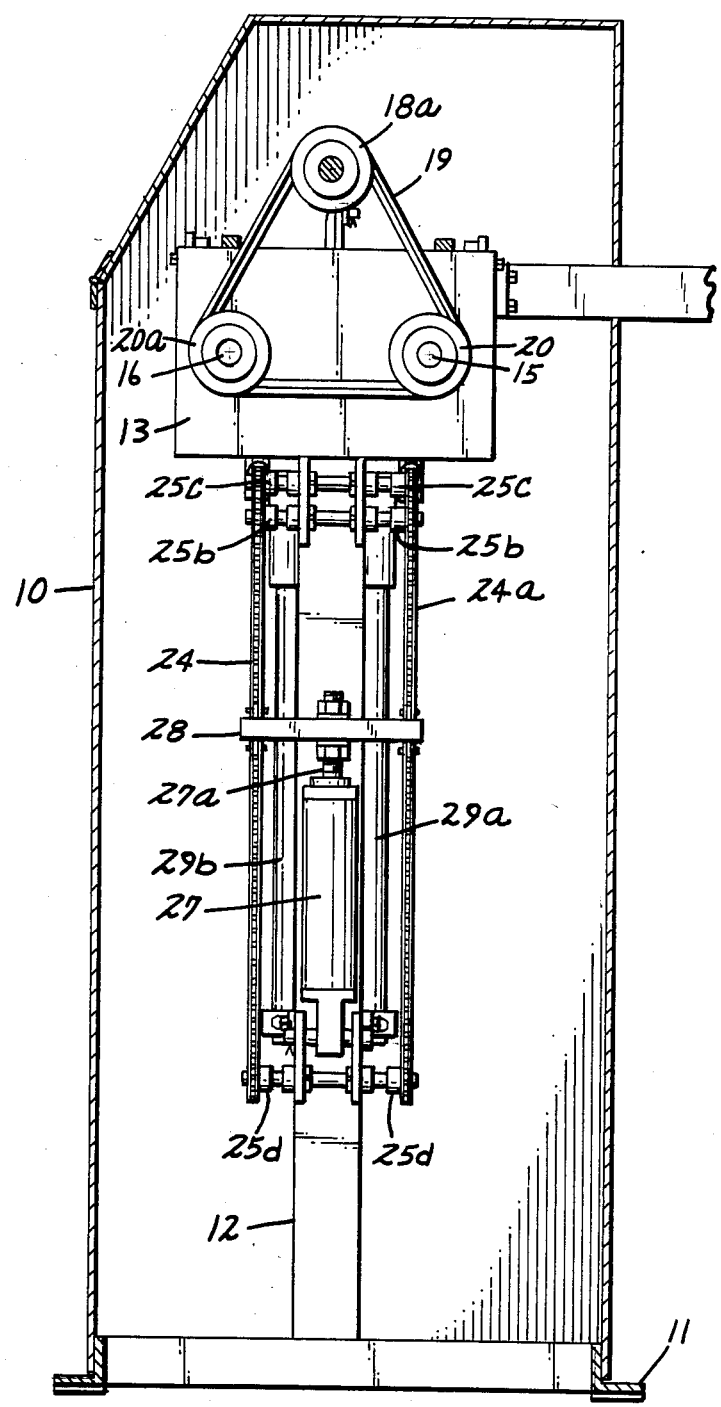
FIG. 5 is a sectional view as seen generally from the line 5—5 of FIG. 2, portions thereof being broken away.
Figure 6:
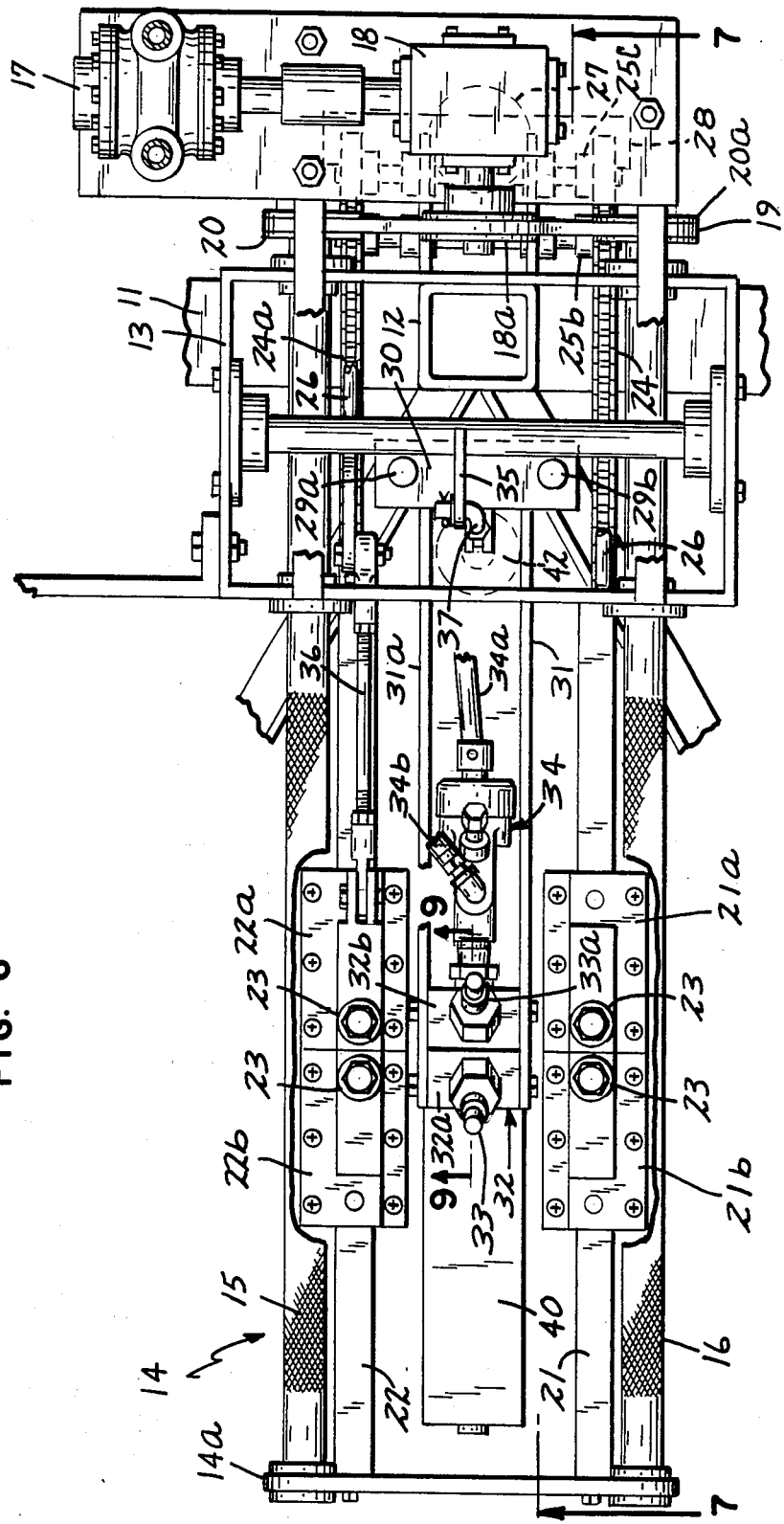
FIG. 6 is a horizontal sectional view as seen from line 6—6 of FIG. 2, portions thereof being broken away.
Figure 8:
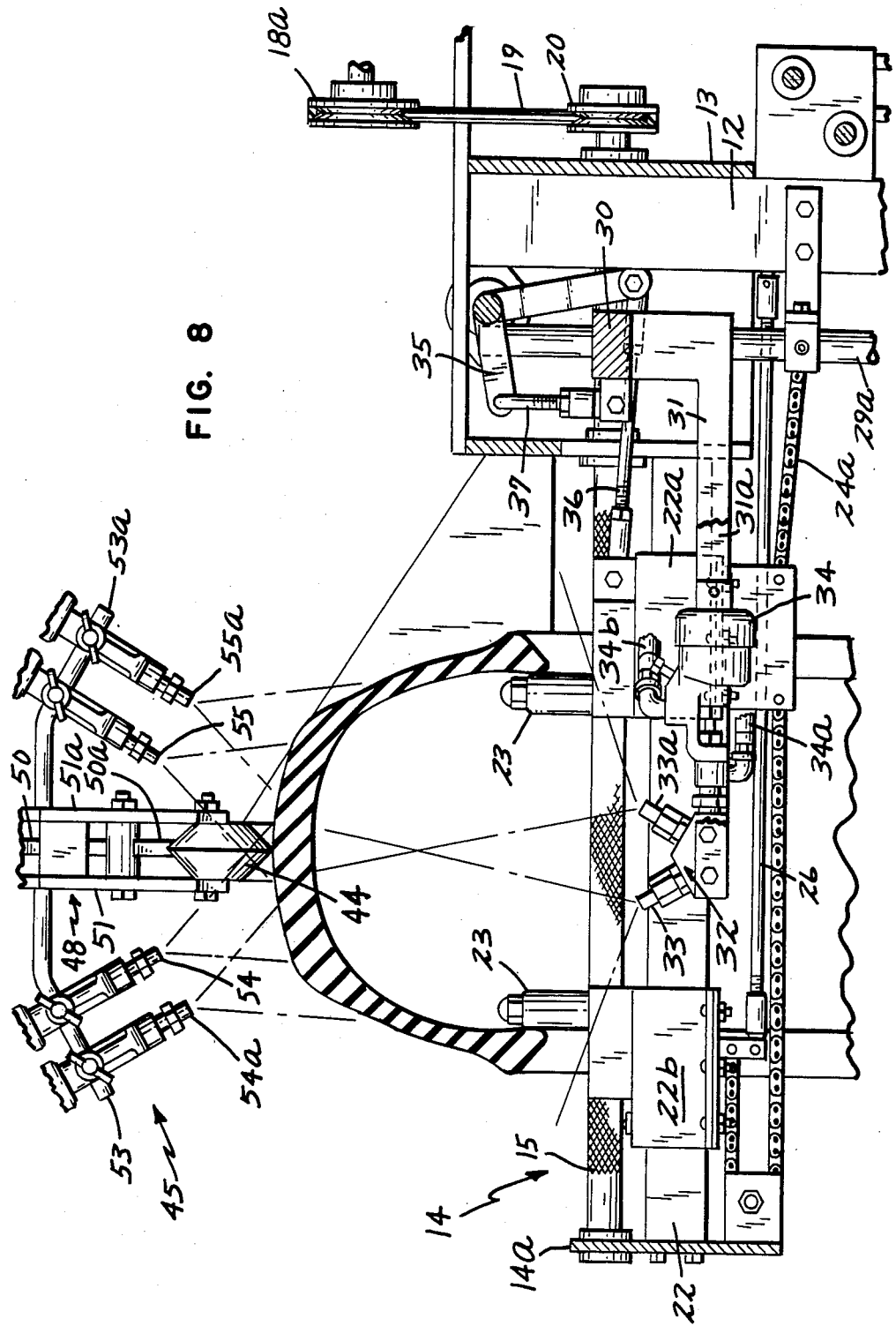
FIG. 8 is a view similar to FIG. 7 but showing a different position of the parts.

Supporting frame portion 14 also includes a pair of spaced bars 21, 22 which extend outwardly from mounting head 13 between and just below drive rollers 15, 16 and which connect at their free ends to the end plate 14a. Bars 21, 22 are parallel to each other and to drive rollers 15, 16. Mounted on bar 21 is a pair of slider members 21a, 21b and mounted on bar 22 is a like pair of slider members 22a, 22b. Mounted on each slider member is an upwardly extending tire bead spreading device 23 which comprises an upwardly extending pin capped by a nut and having mounted thereover a tubular member which is free to rotate about the pin. Each pair of slider members is moveable between adjacent positions as shown in FIG. 2 at the center of the frame portion 14 to permit a tire to be mounted thereover with the bead spreading devices 23 extending upwardly between the tire beads, and spaced apart positions to spread the tire as shown in FIG. 8. Slider members 21a, 21b are moved by a drive chain 24 which extends over a sprocket 25a mounted on end plate 14a, a pair of sprockets 25b, 25c located at the opposite end of the supporting frame portion 14 near the vertical standard 12 and a sprocket member 25d mounted closer to the bottom of vertical standard 12. Drive chain 24 extends from a connection at one end to slider member 21a over sprocket 25a to a connection with slider member 21b, over sprocket 25b and sprocket 25d and then upwardly over sprocket 25c for connection with a rod 26 connected at its opposite end to slider member 21b. A double acting air-operated drive cylinder 27 is mounted oh vertical standard 12 by means of suitable bracket members and has an upwardly extending drive rod 27a attached to a horizontally extending drive block 28. It is noted at this point that the slider members 22a, 22b are operated by a similar drive chain assembly including a drive chain 24a. As shown in FIG. 5, the opposite ends of drive block 28 are connected to the drive chains 24, 24a. In the position shown in FIG. 2, the drive rod 27a is in the withdrawn or lower position and the slider members 21a, 21b are in the adjacent positions. To spread the slider members, the air cylinder 27 is actuated to extend drive rod 2a thus raising the drive block 28 and pulling the slider members apart. Because the two drive chains are interconnected by the drive block 28, and because the corresponding sprockets are keyed to each other, the two sets of slider members operate in unison.

Figures 7, 9:
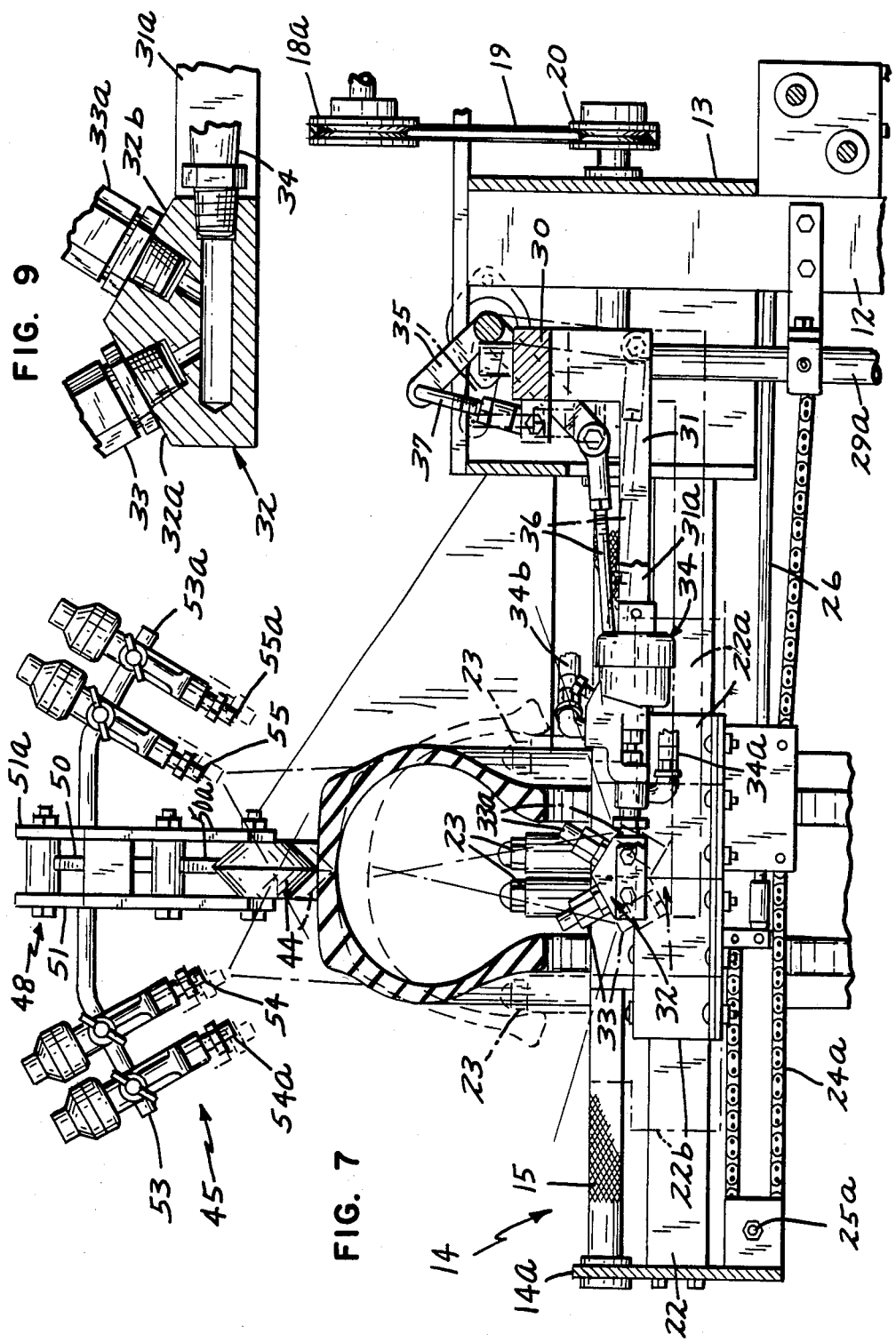
FIG. 7 is a sectional view as seen generally from line 7—7 of FIG. 6.
FIG. 9 is an enlarged sectional view as seen generally from the line 9—9 of FIG. 6.

The support frame includes a pair of spaced, parallel, vertical posts 29, 29a positioned along the standard 12 in the direction of supporting frame portion 14. A follower member 30 is mounted near the upper ends of the posts for vertical movements therealong. A support arm means comprising a pair of spaced arms 31, 31a extends horizontally from the follower member 30 to a pair of free ends located adjacent the bead spreading devices 23 at their center positions. Support arms 31, 31a extend between and parallel to the bars 21, 22 and drive rollers 15, 16. A spray block 32 is mounted between the free ends of the arms 31, 31a, the block having an upwardly extending apex and a pair of upper walls 32a, 32b which slope downwardly and outwardly from the apex and face the tire sidewalls. A pair of spray nozzles 33, 33a are mounted in ports in the walls of the block so that when in operation the liner spray is directed upwardly into the interior of the tire as best shown in FIGS. 7 and 8. Connected to the block 32 between the arms 31, 31a is a spray gun 34 which, when energized, provides liner spray to the nozzles through ports in the block. Spray gun 34 is provided with spray fluid under pressure through line 34a and is controlled by air pressure through line 34b. In the preferred embodiment, the spray gun 34 is a Model 206-513 Series H automatic spray control device manufactured by Graco Inc. of Minneapolis, Minnesota, U.S.A.

There is a linkage mechanism connecting slider member 22a to follower member 30 to automatically move the liner spray nozzles 33, 33a from an upper position as shown in FIG. 2 when the slider members are in their adjacent positions to a lower position as shown in FIGS. 7, 8 when the slider members are spaced apart. Lowering the liner spray nozzles 33, 33a spaces them further from the interior of the tire and broadens the arc covered by the spray. Because the spacing of the slider members reflets the size of the tire being sprayed, the position of the liner spray nozzles is made proportional thereto. The linkage which controls the vertical positioning of the liner spray nozzles 33, 33a includes an L-shaped rocker arm 35 pivotally mounted at the point where its two arms connect generally above the follower member 30, having its lower end connected to slider member 22a by a link 36 and having its short end connected to the follower member 30 by a link 37. Thus, with reference to FIG. 2, 6, movement of slider member 22a to the right to open the space between the slider members and spread a tire causes link 36 to rotate rocker member 35 in a counterclockwise direction to in turn cause link 37 to move follower member 30 and the spray nozzles 33, 33a downwardly to increase the distance between the spray nozzles and the interior of the tire. The horizontal sliding movements of the slider members are thus translated by the linkage into vertical movements of the follower member and support arms.

A tire hold-down member 40 extends horizontally from the support frame below the tire supporting frame portion 14 to extend through the central opening of the tire and engage the tire beads to hold the tire down against the drive rollers 15, 16. The inner end of the hold-down member 40 is attached to a pair of bearing members 41, 41a which are slideably mounted over posts 29b, 29a respectively. An air operated, two-way drive cylinder 42 has one end connected to base 11 and the end of the drive piston connected to hold-down member 40 such that extending the piston raises the hold-down member 40 to a raised position out of engagement with the tire and retracting the piston lowers the hold-down member 40 into engagement with the beads of the tire as shown in FIGS. 1 and 2. Hold-down member 40 is an inverted channel member having a generally U-shaped cross section, having a downwardly facing roller 40a journalled in the channel member at its ends which engages the tire beads and rotates as the tire is being rotated As shown in FIG. 2, the tire supporting frame portion 14 is adapted to be received in the central opening of a tire for supporting the tire for rotation in a plane perpendicular to the frame portion 14, the plane bisecting the crown of the tire and extending between the adjoining pairs of slider members 21a, 21b and 22a, 22b. Means are also provided on the support frame for spraying a recapping cement on the tire crown as the tire is being rotated. This includes further spray nozzle means 45 mounted generally above the tire. A mounting plate 46 extending from the support frame carries at its end a vertically extending mounting post 47 which lies in the previously referred to plane bisecting the crown of the tire. A trailer assembly 48 which includes a tire crown engaging wheel 44 at its free end is mounted on the post 47 for trailing movements as the tire is rotated. The trailer assembly 48 includes a bearing member 49 mounted on the post 47 for pivotal movements about a vertical axis, a parallel linkage which includes upper and lower parallel arms 50, 50a pivotally mounted at their inner ends to the bearing member 49 and pivotally connected at their outer ends to a pair of spaced connector members 51, 51a each having an outwardly and downwardly extending member between the ends of which the wheel 44 is rotatably mounted. A pair of springs 52 are connected between the end of upper arm 50 adjoining bearing member 49 and the end of lower arm 50a adjoining connector members 51, 51a to bias the free end of trailer assembly 48 upwardly to reduce the amount of power required to lift the assembly Extending outwardly from the sides of connector members 51, 51a in a direction generally perpendicular to the previously referred to plane, are a pair of support arms 53, 53a. Mounted on the end of arm 53 are a pair of inner and outer cement spray nozzles 54, 54a respectively, and mounted on the end of arm 53a are a pair or inner and outer cement spray nozzles 55, 55a respectively. The arms 53, 53a are formed so that each pair of nozzles extends generally downwardly and inwardly toward the crown of the tire. The cement spray nozzles 54, 54a and 55, 55a are positioned a predetermined distance above the tire crown when the wheel 44 is resting on the crown as shown in FIG. 1.

Extending rearwardly over post 47 from arm 50 is an extension 57 and extending below it from the base of post 47 is an anchor arm 58. A two-way air operated cylinder 59 has one end connected to anchor arm 58 and the end of its drive piston connected by a cable 59a to the end of extension 57. With the piston of cylinder 59 extended the trailer assembly 48 is free to drop downwardly into the dashed-line position shown in FIG. 3 for engagement of the wheel 44 with the crown of the tire. Because cable 59a is free to flex, trailer assembly 48 is free to move upwardly and downwardly to accommodate different tire sizes, and because it is a free-trailing assembly the wheel 44 will seek the center of the tire crown. When the piston of cylinder 59 is retracted, cable 59a pulls extension 57 downwardly and thus raises trailer assembly 48 to the raised position shown in FIG. 3 where it is held out of contact with the tire so that the completed tire can be removed and a new tire inserted over tire supporting frame portion 14 without interfering with the trailer assembly 48.

FIG. 4 discloses in more detail one of the cement spray guns 54 which includes an inlet for the liquid spray material at 60 and an inlet 61 for the control air. The unit shown is a Model 22AUH AUTOJET ™ spray gun manufactured by Spraying Systems Company of Wheaton, Illinois, U.S.A. The unit has a built-in air-actuated cylinder to open the valve and a stainless steel spring which automatically closes the valve when the air is released. The liquid is supplied to the spray gun in a pressurized form and the spray gun produces a waterfall sheet of spray using a low liquid pressure alone. The unit can be cycled on and off very rapidly by sending and releasing compressed air to the air inlet 61.

For small tires such as passenger car tires only the two interior spray guns 54, 55 need to be used to provide full coverage. For larger tires, such as truck tires, all four spray guns can be used. In all cases, the trailer assembly 48 holds the cement spray nozzles at a predetermined distance from the tire crown as the tire is rotated and the parallel linkage forming the trailer assembly 48 holds the nozzles in a fixed orientation with respect to the tire crown as the trailer assembly is raised and lowered. It can be seen from FIG. 3 that the connector members 51, 51a retain the same vertical orientation as the assembly is raised and lowered.

The system as described is wholly powered by compressed air so that there is no need for an electric supply. This makes the system explosion-proof and also makes the unit readily applicable for use in different countries which may have a different electrical supply system. All that is required for operating the tire spraying apparatus of the present invention is a supply of compressed air.

The general sequence of operation is as follows. When compressed air is supplied to the system, motor 17 starts, trailer assembly 48 is lowered onto the tire, and hold-down arm 40 is lowered into engagement with the tire. When those steps are completed, slider members 21a, 21b, and 22a, 22b are spread to engage the bead spreading rollers 23 with the tire beads to spread the tire. At the same time, liner spray nozzles 33, 33a are lowered by the arms 31, 31a which are linked to slider member 22a so that the nozzles are adjusted to the correct distance from the tire. The selected nozzles are then energized to spray the tire. If only recapping cement is to be applied to a passenger tire, the two inner cement spray nozzles 54, 55 are energized but if cement is to be applied to a truck tire, all four cement spray nozzles are actuated. Alternatively, the operator can select to actuate only the two liner spray nozzles 33, 33a by sending a supply of compressed air through line 34b to actuate a piston within spray gun 34 to permit the pressurized spray fluid to be discharged through the nozzles. When the air pressure is released, the spray gun automatically stops the spray discharge. The operator can also elect to spray both the inside and outside of a passenger tire in which event only the two inner cement spray nozzles will be used or can elect to spray both the inside and outside of a truck tire in which event all of the nozzles are used. When the spraying is completed, the unit shuts off and at the same time the trailer assembly 48 is raised to move the cement spray nozzles away from the tire, hold-down arm 40 is raised to release the tire and the slider members 21a, 21b and 22a, 22b are returned to their central, adjacent positions which also lifts the spray nozzles 33, 33a to their upper position. The coated tire can then be removed and a new tire placed on the tire supporting frame portion 14.

Although a fully automatic system for operating the tire spraying apparatus will be described, it is evident that all of the various control functions could be independently controlled by means of separate air valves or switches.

The automatic control system for the machine is depicted in FIG. 10. Commercially available compressed air capable of providing 80 cfm at 120-200 psi is supplied to filter 65 through air inlet 66. With the system still off, filtered air is supplied as follows: to the main air regulator 67 which provides output air at 65 psi through the oiler 68 to the two-position pilot operated four-way valve 69 through a valve 70 to the trailer assembly controlling cylinder 59 to retract the cylinder to hold the trailer assembly 48 in the upper position, to the hold-down cylinder 42 to extend that cylinder, to the passenger spread pressure regulator 71 which provides a regulated output of 45 psi to the three stacked two-position pilot operated four-way valves 72, 73 and 74, through the valve 72 to the tire spread cylinder 27 to hold the piston of that cylinder in the retracted position. Compressed air is also provided from the main air regulator 67 through line 67a to the start switch 75, which is a normally open push button switch, and the stop switch 76, which is a normally closed push button switch. Air is provided through the switch 76 to a first logic control device 77.

Compressed air from the filter 65 is also supplied to a truck spread pressure regulator 78 which provides a regulated output at 95 psi to a two-position pilot operated four-way valve 79. In this "off" condition, the trailer assembly 48 is in the raised position, the slider members are in their adjacent, closed positions, and the hold-down member 40 is raised.

A tire is then placed on the tire supporting frame portion 14. The operator must then select the method of operation. Selector switch 80 is a three-position selector switch which is normally open. It can be actuated to close the left-hand set of switches to actuate the liner spray nozzles, the right-hand set of switches to actuate the cement spray nozzles, or both. Switch 81 is a two-position, normally open selector switch. The left-hand contacts can be closed to control a truck tire and the right-hand contacts closed to control a passenger tire. To initiate operation, the operator sets the selector switches 80 and 81 and pushes the momentary start button 75. When the start button is pushed, two sequences occur regardless of how the selector switches are set. First, the compressed air provided to switch 75 through line 67a is routed through start switch 75 through line 75a to a "set" inlet on logic control 77 to start the timer represented by the circle. Logic control 77 immediately sends out a signal through line 77a to actuate valve 69 which then supplies air to both the air motor 17 to start the motor and to a hold-down cylinder pressure regulator 82 and to a line 83 to extend the trailer control cylinder 59. This permits the trailer assembly 48 to drop down into position against the tire. Regulator 82 provides air at 65 psi to the hold-down cylinder 42 to retract its piston.

At this point, the motor 17 is running to drive the drive rollers, the hold-down cylinder 43 is retracted to hold the tire against the drive rollers and the trailer assembly control cylinder 59 is extended to permit the trailer assembly 48 to drop down against the tire. During a preset time after receiving the start signal, usually 3-5 seconds, logic control 77 sends two signals, one through line 77b to energize valve 72 and thus provide compressed air from regulator 71 to the bottom of tire spread cylinder 27 to extend the cylinder and spread the tire. At the same time, air supply and start signals are sent through line 77c to the second logic controller 85 which delays for a preset period of time, then sends a signal through line 85a to the selector switches 80 and 81. As noted above, the previously described sequence occurs in all cases. What follows depends upon how the selector switches 80 and 81 are set. Let us assume the operator sets switch 80 to out (O) and switch 81 to truck (T), closing those two switches. Line 81a is then energized to start the timer 84 marked "T". The upper timer 84 marked "T" is a Model 59062 manufactured by the Aro Corporation of Bryan, Ohio, U.S.A. The center switch is a Model 59010 and the bottom passenger time delay marked "P" is a Model 59121 manufactured by the same company. In this application, the top time delay T is set to provide an output signal from the center switch after 9.5—10 seconds and the bottom time delay P is set to provide an output signal after three seconds when actuated. At the same time that the truck timer 84T is actuated, a signal is sent through line 81b to energize the two-position pilot operated four-way valves 79 and 87. When valve 79 is actuated, air from the truck spread regulator 78 is provided to the bottom port of spread cylinder 27. Because this air is under higher pressure, it extends the piston of cylinder 27 a further distance to properly open the truck tire. Air is also supplied through switch 80 to line 80a to energize valve 74 which provides air under pressure from regulator 71 to valve 87 and to the spray guns controlling inner cement spray nozzles 54, 55. Valve 87, being energized, provides compressed air to the spray guns controlling outer cement spray nozzles 54a, 55a. The truck tire is thus rotated and the cement spray gun is actuated for 9.5—10 seconds, at which time the timer 84 sends a signal through line 84a which tells the logic control 85 to immediately shut off air to line 85a and to send a signal through line 85b to turn on the bottom logic controller 86. When the air is removed from line 85a, the pilot valves controlled through switches 80 and 81 are deenergized and returned to their normal positions.

The upper timer on the logic control 86 is set to zero so that the signal through line 85b immediately results in an output signal through line 86a to logic control 77 which cancels the signal through line 77b to deactivate pilot valve 72 to cut off pressure to the spread cylinder 27 from the spread regulator 71. The output of the upper timer also starts the lower timer of logic control 86 and after two seconds a signal is sent through 86b to logic control 77 which cancels the signal through line 77a to permit valve 69 to return to its normal position, thus stopping motor 17, retracting trailer cylinder 59 and extending hold-down cylinder 42. The signal through line 86b to logic control 77 thus cancels the remaining output signal and resets the timer so that all aspects of the system are again in the "ready" condition previously described. Because switch 75 was closed only momentarily to initiate the sequence, it does not have to be reset.

If the operator wishes to spray only the interior of a truck tire, switch 80I is closed and switch 81T is closed Assuming that the sequences previously described when the start button is momentarily closed have occurred, air under pressure from line 85a is being provided to the switches 80 and 81 to thus activate time delay switch 84T, the pilot valve 79 to apply the higher pressure to tire spread cylinder 27, and a signal from switch 80 to actuate pilot valve 73 to activate the liner spray nozzles. After the previously described time delay, the sequence previously described repeats itself to shut down the system.

If the operator wishes to spray only the inside of a passenger tire, switches 80I and 81P are closed. The signal through line 81c actuates time delay 84P which has a time delay of three seconds, sufficient time to provide a single rotation of a passenger tire. At the same time, the signal from switch 80I activates pilot valve 73 to activate the liner spray nozzles 33, 33a. After the three second delay, a signal is provided through line 84a to logic control 85 to stop the sequence as previously described.

If the operator wishes to spray both the interior and the exterior of a passenger tire, both switches 80I and 80O are closed and switch 81P is closed. This activates the three second time delay 84P through line 81c. The two signals from switch 80 activate pilot switches 73 and 74 which in turn activate the liner spray nozzles 33, 33a and the two interior cement spray nozzles 54, 55. After three seconds, a signal is provided through line 84a to logic control 85 to initiate the shut down sequence previously described.

If the operator wishes to apply both sprays to a truck tire, switches 80I and 80O are closed and switch 81T is closed. The two signals from switch 80 actuate pilot valves 73 and 74 to actuate the liner spray nozzles and the two interior cement spray nozzles. The signal through line 81a starts the timer 84T and also provides a signal through line 81b to activate the two pilot valves 79 and 85, which in turn provide air to actuate the outer cement spray nozzles 54a, 55a and provide higher pressure to the tire spread cylinder 27. After the time delay is completed, the signal through line 84a again initiates the shut down sequence.

If the operator wishes to spray only the outside of a passenger tire, switches 80O and 81P are closed to initiate the time delay 84P and activate pilot valve 74 which in turns provides compressed air to the controls for the two inner cement spray nozzles 54, 55. After the three second time delay, a signal is provided through line 84a to initiate the shut down procedure.

The three logic controls which include adjustable timers are all manufactured by the Aro Corporation of Bryan, Ohio, U.S.A. Control number 77 is identified as Model No. 59895L, control number 85 is Model No. 59900L, and control number 86 is Model No. 59896L.

We claim:

1. A tire spraying apparatus for tires having spaced beads surrounding a central opening, a crown portion and spaced sidewalls connecting said beads to the crown portion, said spraying apparatus comprising:
   (a) a support frame including a tire supporting frame portion extending horizontally therefrom adapted to be received in the central opening of an uninflated tire suspended thereon;
   (b) means including tire bead engaging drive roller means on said tire supporting frame portion for rotating the tire suspended thereon;
   (c) a tire hold-down member extending from said support frame through the central opening below said tire supporting frame portion to engage the tire beads to hold the tire against said rollers;
   (d) means mounting said hold-down member for vertical movements between a raised position and a lower, tire bead engaging position;
   (e) means including liner spray nozzle means for spraying a liquid liner material upwardly into the tire interior;
   (f) means mounting said liner spray nozzle means on said frame adjacent said roller means; and
   (g) bead spreading means on said tire supporting frame-portion for spreading the sidewalls of a tire mounted thereon to hold the sidewalls apart while the tire is being rotated and sprayed.

2. Tire spraying apparatus according to claim 1 wherein said drive roller means comprises a pair of spaced drive rollers, and wherein said tire supporting frame portion extends from said support frame in cantilever fashion and comprises a pair of spaced bars positioned between said drive rollers each having a pair of slider members mounted thereon, each slider member carrying a bead spreading device, each pair of slider members being moveable between adjacent positions in line with said spray nozzle means to permit a tire to be mounted thereover and spaced apart positions to spread the tire, and means for moving said slider members between said positions.

3. Tire spraying apparatus according to claim 2 wherein said last-named means comprises a pair of drive chains extending over sprockets located at opposite ends of said tire supporting frame portion and at a bottom end of said support frame, having opposite ends of each connected to one pair of said slider members and a drive cylinder on said support frame connected to said drive chains to move said chains together in one direction or the other to operate said slider members.

4. Tire spraying apparatus according to claim 1 wherein said drive roller means comprises a pair of spaced drive rollers, and wherein said means mounting said spray nozzle means includes support arm means extending outwardly from said support frame between said drive rollers, and means mounting said support arm means at one end thereof on said support frame for vertical movements within a predetermined range to accommodate the spraying of different sized tires.

5. Tire spraying apparatus according to claim 4 wherein said tire supporting frame portion comprises a pair of spaced bars positioned on opposite sides of said spray nozzle means and between said drive rollers, each bar having a slider member mounted thereon carrying a bead spreading device, each pair of slider members being moveable between first, adjacent positions in line with said spray nozzle means and second, spaced apart positions to spread the tire.

6. Tire spraying apparatus according to claim 5 including linkage means connecting at least one of said slider members to said support arm means to automatically move said spray nozzle means from an upper position when said slider members are in said first position to a lower position when said slider members are in said second position.

7. Tire spraying apparatus according to claim 6 wherein said support frame includes a pair of spaced, vertical posts and said support arm means includes a follower member at said one end mounted over said posts, and wherein said linkage comprises a rocker arm mounted on said support frame having one end connected by a link to one of said slider members and having an opposite end connected by a link to said follower member whereby horizontal sliding movements of said slider members are translated by said linkage into vertical movements of said follower member and support arm means.

8. Tire spraying apparatus according to claim 7 wherein said support arm means comprises a pair of spaced, horizontally extending arms having free ends, and wherein said spray nozzle means comprises a spray block mounted between said free ends of said arms, said block having an upwardly extending apex and a pair of upper walls sloping downwardly and outwardly and facing the tire side walls, a pair of nozzles mounted in ports in said walls of said block, and means for supplying a liquid spray material to said block and nozzles.

9. Tire spraying apparatus according to claim 1 wherein said tire supporting frame portion is adapted to be received in the opening of a tire for supporting the tire for rotation in a plane perpendicular thereto and bisecting the crown of the tire, and wherein means are provided on said support frame for spraying a recapping cement on the tire crown as the tire is being rotated.

10. Tire spraying apparatus according to claim 9 wherein said last-named means comprises further spray nozzle means, and means mounting said further spray nozzle means generally above the tire, including means for adjusting the position of said further spray nozzle means to accommodate different sized tires.

11. Tire spraying apparatus according to claim 10 wherein said means mounting said further spray nozzle means comprises a mounting post carried by said support means in said plane, a trailer assembly including a tire crown engaging wheel mounted on said post for trailing movements as the tire is rotated, said further spray nozzle means being mounted on said trailer assembly.

12. Tire spraying apparatus according to claim 11 wherein said trailer assembly comprises a bearing member mounted on said post for pivotal movements about a vertical axis, a parallel linkage mounted to said bearing member having a free end spaced from said bearing member over the tire, said wheel being rotatably mounted on said free end, said further spray nozzle means comprising at least a pair of cement spray nozzles mounted on opposite sides of said free end of said parallel linkage, said trailer assembly holding said cement spray nozzles at a predetermined distance from the tire crown as the tire is rotated and said parallel linkage mounting said cement spray nozzles in a fixed orientation with respect to the tire crown as the trailer assembly moves upwardly and downwardly to follow a tire or accommodate different sized tires.

13. Tire spraying apparatus according to claim 11 including means for raising and lowering said trailer assembly with respect to the tire crown.

14. Tire spraying apparatus according to claim 11 wherein said trailer assembly comprises a bearing member mounted on said post for pivotal movements about a vertical axis, a parallel linkage mounted to said bearing member to be moveable upwardly and downwardly with respect to said bearing member, said parallel linkage having a free end spaced from said bearing member which carries said wheel and said further spray nozzle means, and actuating means connected between said mounting post and said parallel linkage for holding said trailer means in an upper position out of contact with the tire crown, and for lowering said trailer means into contact with the tire crown.

15. Tire spraying apparatus according to claim 14 including spring means mounted between said mounting post and said free end of said parallel linkage to provide assistance in raising said trailer assembly to said upper position.

16. Tire spraying apparatus, comprising:
    (a) a tire supporting frame;
    (b) means including tire bead engaging drive means on said tire supporting frame for rotating a tire suspended thereon;
    (c) a tire hold-down member extending from said support frame to engage the tire beads to hold the tire against said drive means;
    (d) means mounting liner spraying means on said tire supporting frame for spraying a liquid liner material upwardly into the tire interior; and
    (e) bead spreading means on said tire supporting frame for spreading the sidewalls of a tire mounted thereon to hold the sidewalls apart while the tire is being rotated and sprayed.

17. Tire spraying apparatus according to claim 16 wherein said tire supporting frame is adapted to be received in the opening of a tire for supporting the tire for rotation in a plane perpendicular thereto and bisecting the crown of the tire, and wherein means are provided on said support frame for spraying a recapping cement on the tire crown as the tire is being rotated.

18. Tire spraying apparatus according to claim 17 wherein said last-named means comprises further spray nozzle means, and means mounting said further spray nozzle means generally above the tire, including means for adjusting the position of said further spray nozzle means to accommodate different sized tires.

19. Tire spraying apparatus, comprising:
    (a) a tire supporting frame;
    (b) means including tire bead engaging drive means on said tire supporting frame for rotating a tire suspended thereon;
    (c) a tire hold-down member extending from said support frame to engage the tire beads to hold the tire against said drive means;
    (d) said tire supporting frame being adapted to be received in the opening of a tire for supporting the tire for rotation in a plane perpendicular thereto and bisecting the crown of the tire; and
    (e) means on said tire supporting frame for spraying a recapping cement on the tire crown as the tire is being rotated.

20. Tire spraying apparatus according to claim 19 wherein said last-named means comprises spray nozzle means, and means mounting said spray nozzle means generally above the tire, including means for adjusting the position of said further spray nozzle means to accommodate different sized tires.

* * * * *

UNITED STATES PATENT AND TRADEMARK OFFICE
CERTIFICATE OF CORRECTION

PATENT NO. : 4,669,417
DATED : June 2, 1987
INVENTOR(S) : Loren K. Pederson et al.

It is certified that error appears in the above-identified patent and that said Letters Patent is hereby corrected as shown below:

Column 2, line 59, delete "21a, 21and" and insert --21a, 21b and--.

Column 3, line 14, delete "oh" and insert --on--.

Column 3, line 25, delete "2a" and insert --27a--.

Column 4, line 37, after "rotated" insert --.--.

Column 4, line 68, after "assembly" insert --.--.

Column 5, line 6, delete "or" and insert --of--.

Column 9, line 22, delete "received" and insert --recessed--.

Signed and Sealed this

Tenth Day of November, 1987

*Attest:*

DONALD J. QUIGG

*Attesting Officer*  *Commissioner of Patents and Trademarks*